(12) United States Patent
Moses et al.

(10) Patent No.: US 10,646,734 B2
(45) Date of Patent: May 12, 2020

(54) PURGE AND PRESSURIZATION SYSTEM WITH FEEDBACK CONTROL

(71) Applicant: Dresser Wayne AB, Perkasie, PA (US)

(72) Inventors: Randy A. Moses, Perkasie, PA (US); Kent W. Robinson, Perkasie, PA (US)

(73) Assignee: Wayne Fueling Systems Sweden AB, Malmo (SE)

( * ) Notice: Subject to any disclaimer, the term of this patent is extended or adjusted under 35 U.S.C. 154(b) by 868 days.

(21) Appl. No.: 14/270,282

(22) Filed: May 5, 2014

(65) Prior Publication Data

US 2015/0314152 A1  Nov. 5, 2015

(51) Int. Cl.
*A62C 2/04* (2006.01)
*A62C 3/00* (2006.01)
(Continued)

(52) U.S. Cl.
CPC ........... *A62C 2/04* (2013.01); *A62C 3/002* (2013.01); *A62C 3/16* (2013.01); *B67D 7/32* (2013.01); *G05D 16/2066* (2013.01)

(58) Field of Classification Search
CPC .......... B67D 7/3236; B67D 7/84; B67D 7/04; F17C 5/06; H01B 317/30–306; G06F 1/20; G06F 1/203; G06F 1/206; G06F 1/181; G06F 1/183–1/188; H05K 7/20; H05K 7/20009; H05K 7/20127; H05K 7/20136; H05K 7/20145; H05K 7/20154; H05K 7/20163; H05K 7/20172; H05K 7/20181; H05K 7/2019; H05K 7/202; H05K 7/20209; H05K 7/20536; H05K 7/206; H05K 7/20609; H05K 7/20618; H05K 7/20636; H05K 7/20645; H05K 7/20654; H05K 7/207; H05K 7/20709; H05K 7/20836; H05K 7/20845; H05K 7/20854; H05K 7/20863; H05K 7/2089; H05K 7/209; H05K 7/20909; H05K 7/20918; H05K 7/20945; H05K 7/20954; H05K 7/20963;
(Continued)

(56) References Cited

U.S. PATENT DOCUMENTS

2,311,374 A * 2/1943 Farmer ............... A62C 2/06
169/61
4,169,225 A * 9/1979 Rickert ............... B01B 1/00
137/209
(Continued)

*Primary Examiner* — Paul R Durand
*Assistant Examiner* — Randall A Gruby
(74) *Attorney, Agent, or Firm* — Mintz Levin Cohn Ferris Glovsky and Popeo, P.C.

(57) ABSTRACT

An air purge and pressurization system that utilizes a variable speed fan and a feedback loop to optimize system operation is described herein. In one embodiment, such a system can include an enclosed container located in an area classified as hazardous, a controller rated for operation within the hazardous area, and a pressure sensor located within the container and coupled to the controller. The system can also include a variable-speed fan located outside the hazardous area and coupled to the controller. The controller can be configured to monitor air pressure within the container and variably control a speed of the fan to maintain the detected pressure above a minimum value. Accordingly, a required pressure can be maintained while minimizing a volume of air forced into the container.

9 Claims, 4 Drawing Sheets

(51) Int. Cl.
  *A62C 3/16* (2006.01)
  *G05D 16/20* (2006.01)
  *B67D 7/32* (2010.01)

(58) Field of Classification Search
  CPC ............ H05K 7/20972; H05K 7/0041; F24F
  2011/0001; F24F 2011/0002; F24F
  2011/0004; B07B 15/02; B07B 15/023;
  Y10S 55/18
  See application file for complete search history.

(56) References Cited

U.S. PATENT DOCUMENTS

| | | | | |
|---|---|---|---|---|
| 4,211,251 A * | 7/1980 | Rickert | B01B 1/00 | 137/209 |
| 4,298,955 A * | 11/1981 | Munday | G05B 23/0221 | 700/266 |
| 4,616,694 A * | 10/1986 | Hsieh | A62B 13/00 | 165/47 |
| 4,802,502 A * | 2/1989 | Williams | A62B 13/00 | 137/377 |
| 4,950,871 A * | 8/1990 | Pollak | F24D 9/00 | 126/110 AA |
| 4,972,866 A * | 11/1990 | Anthony | G01N 33/0029 | 137/110 |
| 4,986,445 A * | 1/1991 | Young | B67D 7/32 | 137/560 |
| 5,101,710 A | 4/1992 | Baucom | | |
| 5,189,392 A * | 2/1993 | Kass | F23N 3/085 | 251/129.04 |
| 5,215,499 A * | 6/1993 | Eberhardt | F24F 11/0001 | 454/256 |
| 5,228,306 A * | 7/1993 | Shyu | F24F 1/027 | 236/49.3 |
| 5,720,658 A * | 2/1998 | Belusa | F24F 11/0076 | 454/229 |
| 5,791,983 A * | 8/1998 | Robertson | F24F 7/08 | 454/229 |
| 6,101,459 A * | 8/2000 | Tavallaei | G06F 1/206 | 702/130 |
| 6,119,715 A * | 9/2000 | Russell | H02B 13/055 | 137/240 |
| 6,192,922 B1 * | 2/2001 | MacGibbon | F16K 3/085 | 137/486 |
| 6,218,951 B1 * | 4/2001 | Colvin | G01N 33/0057 | 340/628 |
| 6,402,613 B1 * | 6/2002 | Teagle | F04D 19/002 | 454/195 |
| 6,423,118 B1 * | 7/2002 | Becerra | B01D 46/0086 | 95/19 |
| 6,473,668 B2 * | 10/2002 | Abuzeid | F24F 11/006 | 198/810.01 |
| 6,481,635 B2 * | 11/2002 | Riley | F24F 11/0017 | 236/49.3 |
| 6,643,130 B1 * | 11/2003 | DeMarchis | H05K 7/20181 | 165/80.3 |
| 6,699,119 B2 * | 3/2004 | Boulanger | F24F 7/06 | 454/238 |
| 6,783,054 B1 * | 8/2004 | Pregeant, Jr. | B23K 9/321 | 219/130.01 |
| 6,945,456 B2 * | 9/2005 | Magee | G07F 19/20 | 235/375 |
| 6,954,684 B2 * | 10/2005 | Frankel | G05D 23/1902 | 361/695 |
| 7,036,559 B2 * | 5/2006 | Stanimirovic | F24F 11/0086 | 165/11.1 |
| 7,091,848 B2 * | 8/2006 | Albarado | B23K 9/32 | 340/3.1 |
| 7,187,529 B2 * | 3/2007 | Natili | H02H 1/0023 | 361/103 |
| 7,397,361 B2 * | 7/2008 | Paulsen | G08B 21/16 | 200/61.03 |
| 7,405,358 B2 * | 7/2008 | Emerson | H02G 15/18 | 174/88 R |
| 7,455,706 B2 * | 11/2008 | Latham | B01D 46/0023 | 174/37 |
| 7,456,753 B2 * | 11/2008 | Kitagawa | H01H 35/24 | 340/501 |
| 7,481,234 B1 * | 1/2009 | Gustafson | E04H 15/425 | 135/156 |
| 7,518,484 B2 * | 4/2009 | Albarado | B23K 26/032 | 340/3.1 |
| 7,551,436 B2 * | 6/2009 | Hata | H05K 7/20563 | 324/502 |
| 7,726,186 B2 * | 6/2010 | Nair | G01F 1/684 | 340/607 |
| 7,765,072 B2 * | 7/2010 | Eiler | F24F 3/16 | 702/31 |
| 7,915,773 B2 * | 3/2011 | Takahashi | B25J 19/0079 | 310/83 |
| 7,925,390 B2 * | 4/2011 | Jingu | F24F 3/161 | 454/187 |
| 8,251,136 B2 * | 8/2012 | Shibata | F24F 12/006 | 165/244 |
| 8,300,410 B2 * | 10/2012 | Slessman | H05K 7/20736 | 165/104.33 |
| 8,315,054 B2 * | 11/2012 | Chen | H05K 7/20745 | 361/679.47 |
| 8,408,356 B2 * | 4/2013 | Yamaguchi | H05K 7/20736 | 181/198 |
| 8,436,277 B2 * | 5/2013 | Wardlaw | B23K 9/16 | 219/130.01 |
| 8,464,751 B2 * | 6/2013 | Su | A62C 99/0018 | 137/487.5 |
| 8,665,591 B2 * | 3/2014 | Bourgeois | H01M 10/399 | 361/679.5 |
| 8,670,870 B1 * | 3/2014 | Bush, Jr. | F24F 1/022 | 236/49.3 |
| 8,947,249 B1 * | 2/2015 | Dore | G01N 33/0057 | 340/3.1 |
| 9,157,670 B2 * | 10/2015 | Kreeley | B23P 19/04 | |
| 9,326,426 B2 * | 4/2016 | James | H05K 7/20572 | |
| 9,586,807 B2 * | 3/2017 | Zuzek | B67D 7/06 | |
| 9,791,903 B2 * | 10/2017 | Hay | H05K 7/20745 | |
| 2002/0196605 A1 | 12/2002 | Hilpert et al. | | |
| 2004/0011421 A1 | 1/2004 | Bartlett et al. | | |
| 2004/0250722 A1 * | 12/2004 | Kumar | B41F 33/0018 | 101/484 |
| 2007/0161298 A1 * | 7/2007 | Moore | H02G 15/013 | 439/797 |
| 2007/0253831 A1 * | 11/2007 | Lee | F24F 3/161 | 417/5 |
| 2008/0055850 A1 * | 3/2008 | Carlson | G06F 1/20 | 361/695 |
| 2008/0185155 A1 * | 8/2008 | Emerson | H01R 13/5208 | 166/378 |
| 2008/0212286 A1 * | 9/2008 | Komatsu | H05K 5/0213 | 361/714 |
| 2008/0311842 A1 * | 12/2008 | Alston | F24F 11/0012 | 454/361 |
| 2009/0020618 A1 * | 1/2009 | Gutierrez | G05D 23/025 | 236/49.3 |
| 2009/0045925 A1 * | 2/2009 | Demin | B67D 7/3236 | 340/12.32 |
| 2009/0088066 A1 * | 4/2009 | Zuzek | B67D 7/84 | 454/184 |
| 2009/0134995 A1 * | 5/2009 | Wardlaw, III | B23K 37/006 | 340/532 |
| 2010/0206065 A1 * | 8/2010 | Hsiao | G01P 5/10 | 73/170.12 |
| 2013/0005235 A1 * | 1/2013 | Ootani | F24F 11/0001 | 454/184 |
| 2013/0130610 A1 * | 5/2013 | Unno | G06F 1/20 | 454/184 |
| 2013/0186180 A1 * | 7/2013 | Downing | G01M 3/226 | 73/40.7 |
| 2013/0324027 A1 * | 12/2013 | Davis | F24F 11/0001 | 454/258 |

(56) References Cited

U.S. PATENT DOCUMENTS

2014/0349563 A1* 11/2014 Honda .................. F24F 1/0007
454/184
2015/0099449 A1* 4/2015 Chen .................. H05K 7/20836
454/184
2015/0314152 A1* 11/2015 Moses ...................... A62C 2/04
169/45

* cited by examiner

PURGE AND PRESSURIZATION SYSTEM WITH FEEDBACK CONTROL

FIELD

The present invention relates to air purge and pressurization systems used to allow operation of electronics in hazardous environments.

BACKGROUND

Environments classified as hazardous due to risk of explosion or fire are common at many commercial and industrial sites. Areas involving fuel-dispensing equipment, for example, are classified as hazardous due to the types of products handled by these dispensers. A well-defined classification system for such hazardous environments has been developed, and equipment can be rated to operate in various environment classes. Areas where ignitable concentrations of flammable gases, flammable liquid-produced vapors, or combustible liquid-produced vapors can exist under normal operating conditions and/or where hazard is caused by frequent maintenance or repair work or frequent equipment failure are classified as Class I, Division 1. The inside of the hydraulic cabinet of a gasoline dispenser would an example of such a classification. Electronics used are required to be "explosion proof" or "intrinsically safe," meaning that they cannot create a spark capable of ignition even in the case of a fault of electronics.

Areas where ignitable concentrations of flammable gases, flammable liquid-produced vapors, or combustible liquid-produced vapors are not normally present, but may exist due to an accidental rupture or breakdown, are classified as Class I, Division 2. This typically includes areas adjacent to Class I, Division 1 areas. The immediate area around a dispenser would be an example of such an area. Electronics used in this area are required to not be able to produce a spark capable of ignition under normal operating conditions.

The type of fuel dispensed determines the classification of the hazardous zones in and around the dispenser. Fuels with vapors that are heavier than air differ from those with properties that are lighter than air and thus create different zones.

Electronics must be designed to meet the requirements of the zone in which they will reside. In some cases this can be expensive (e.g., the design of Intrinsically Safe Barriers or Explosion-proof boxes) and, in still other cases, it may be that the electronics cannot be designed or protected so as to perform the desired function while meeting the zone requirements (e.g., the design of a receipt printer to be used in a Class I, Division 1 area).

In certain cases it can be desirable to use general-purpose electronics that are not rated for operation in any classified hazardous environment. In such cases, a technique for permitting the use of insufficiently rated electronics is to provide a purge/pressurization system to create a safe environment within a portion of the hazardous environment. Purge systems operate by drawing air from a source outside the hazardous environment and forcing it into a container within the hazardous environment so as to create a positive pressure within the container. So long as the positive pressure is maintained, vapors from the hazardous environment will not be able to enter the container and power can be safely supplied to the electronics.

Purge systems are not without drawbacks, however. For example, the air drawn into the system from outside the hazardous environment can include dirt or moisture that can be harmful to the electronic components (e.g., printed circuit boards, displays, etc.) disposed within the purged environment. Furthermore, the temperature of the air introduced into the purged environment can be unregulated and can also negatively affect operation of certain components (e.g., displays, receipt printers, etc.).

In addition, the flow rate of purge systems can be fixed and therefore not adaptable to varying ambient conditions such as relative humidity, temperature, wind speed, etc. Indeed, prior art purge systems are commonly designed to operate at a single flow rate that is calculated to maintain the required pressure under a "worst-case scenario" where, e.g., leaks have developed in the purged container, extreme temperatures are experienced, etc. As a result of the fact that the flow rate is fixed and higher than normally required, the systems are regularly producing a greater volume of airflow than is necessary.

The greater volume of airflow can produce a number of detrimental effects. At the outset, continually running the purge system at the "worst-case scenario" flow rate wastes energy and inflicts undue wear and tear on the driving fan and other components of the system. In addition, if the supplied air is carrying dirt or moisture, a greater amount of each of these contaminants is being introduced than is necessary. Similarly, the temperature of the air being introduced can be detrimental to operation of the electronics within the purged environment, e.g., when frigid air is forced into a container during winter months when heating of the container would be desirable.

Accordingly, there is a need in the art for improved purge and pressurization systems that allow for the use of electronic components in a hazardous environment. In particular, there is a need for such systems that can optimize the flow rate of air into the purged environment and thereby minimize any negative side effects of system operation.

SUMMARY

The present invention addresses these needs by providing an air purge and pressurization system that utilizes a variable speed driving fan and a feedback loop to optimize the volume of air being forced into a purged environment. Such a system can effectively minimize the volume of air forced into the purged environment, thereby reducing any negative effects of such airflow. In addition, systems according to the teachings of the present invention can adapt to varying ambient conditions over time, as well as other changes, such as the development of minor leaks in a purged container, etc. As a result, purge systems according to the teachings of the present invention can increase the efficiency, longevity, and safety of electronics operating within a hazardous environment. Such systems can have particular utility in fuel dispensing applications, such as dispensers for gasoline, compressed natural gas (CNG), and liquefied natural gas (LNG), but can also be applied broadly to any application where it is necessary to bring a hazardous classified environment to an unclassified state.

In one aspect, an air purge and pressurization system is provided that can include an enclosed container located in an area classified as hazardous, a controller rated for operation within the hazardous area, and a pressure sensor located within the container and coupled to the controller. The system can also include a variable-speed fan located outside the hazardous area and coupled to the controller, and the fan can be configured to force air from outside the hazardous area into the container. In addition, the controller can be configured to monitor an air pressure detected by the pressure sensor and variably control a speed of the fan to maintain the detected pressure above a minimum pressure. The pressure sensor can therefore be utilized as a feedback loop to adjust the speed of the fan and pump only the required volume of air into the container. As explained in more detail below, such a system can also include a number of other features and/or modifications, all of which are considered within the scope of the present invention.

In another aspect, a method for powering electronic devices within an area classified as hazardous is provided that can include detecting a pressure within an enclosed container located in the hazardous area using a pressure sensor and variably controlling a speed of a fan located outside the hazardous area and air-coupled to the container based on the detected pressure to achieve a minimum pressure within the container. The method can further include selectively applying power to an electronic device disposed within the container if the detected pressure is above the minimum pressure.

As mentioned above, the teachings of the present invention can have particular utility in fuel dispensing applications. In one aspect, for example, a natural gas dispenser system can be provided that includes a hydraulic chassis configured to transfer natural gas into a portable container, and an electronic head coupled to the hydraulic chassis, where the electronic head defines an enclosed container housing at least one electronic component not rated for operation in a hazardous area surrounding the hydraulic chassis. The system can further include a pressure sensor disposed within the electronic head to detect a pressure therein, and a variable-speed fan located outside the hazardous area and configured to deliver air from outside the hazardous area into the container. The system can also include a controller rated for operation in the hazardous area that is coupled to the pressure sensor, the variable-speed fan, and the at least one electronic component disposed within the container. The controller can be configured to adjust a speed of the fan based on the detected pressure and selectively power the at least one electronic component if the detected pressure is above a minimum pressure.

One of skill in the art will appreciate further variations and advantages of the systems described herein relative to the prior art. Such variations are considered within the scope of the invention.

BRIEF DESCRIPTION OF THE DRAWINGS

The aspects and embodiments of the invention described above will be more fully understood from the following detailed description taken in conjunction with the accompanying drawings, in which.

DETAILED DESCRIPTION

Certain exemplary embodiments will now be described to provide an overall understanding of the principles of the systems and methods disclosed herein. One or more examples of these embodiments are illustrated in the accompanying drawings. Those skilled in the art will understand that the systems and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

The present invention is generally directed to air purge and pressurization systems that can be used to create a safe, unclassified area within an environment classified as hazardous due to the presence of explosive gases. Such systems can be used, for example, to protect and allow for the use of electronic components that are otherwise not rated for use in the hazardous environment. Disclosed herein are novel purge and pressurization systems that utilize a feedback loop (provided using, e.g., a pressure sensor within the volume being protected) to control a variable speed fan that provides inert airflow for purging and/or pressurization. By using detected pressure within the protected volume as a feedback control input, the systems described herein can effectively minimize the volume of air being forced into the protected volume. Further, the flow rate of inert air can change over time depending on changes in ambient pressure, temperature, humidity, wind speed, etc., thereby allowing the system to run at an optimum level in any condition. This is in marked contrast to prior art systems that utilize fixed-speed fans and therefore must always operate at a speed that is sufficient to provide pressurization under the worst possible conditions.

Figure 1:
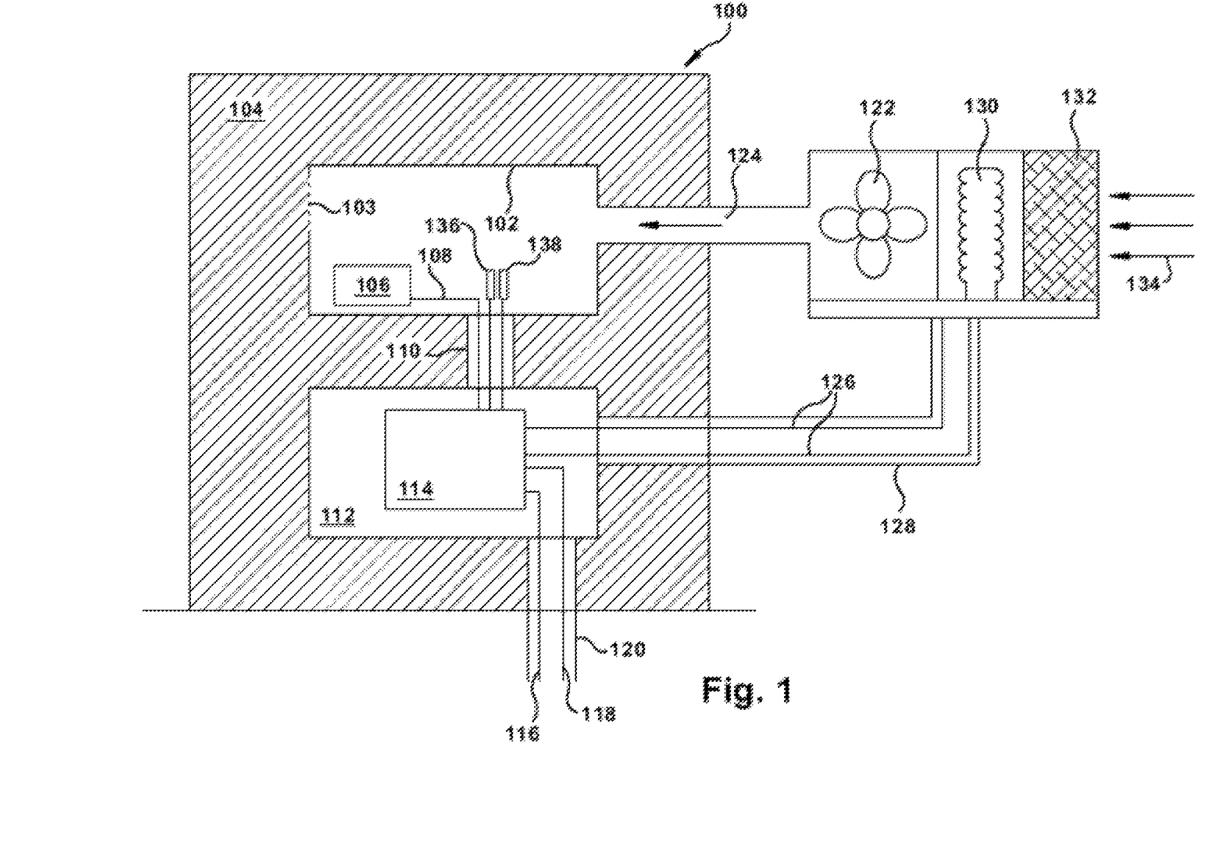
FIG. 1 is an illustration of one embodiment of a purge system according to the teachings of the present invention.

FIG. 1 illustrates one embodiment of a purge and pressurization system 100 (sometimes known in the art as an "X-type purge" or "X Purge" system) according to the teachings of the present invention. The system generally includes a container 102 that is to be protected from a surrounding hazardous environment 104. The container 102 can have at least one vent 103 that allows air to escape into the surrounding area at a known rate. The container 102 can also house any of a variety of electronic components 106 that can be general-purpose in nature, i.e., not rated for use in any type of classified environment, or insufficiently-rated for the type of hazardous environment 104 that is present (e.g., a Class I, Division II-rated payment terminal being disposed in a Class I, Division I environment). The electronics 106 can be coupled to an electrical power delivery line 108 that can be selectively energized to provide power to the electronics. The power line 108 can extend out of the container 102 through, for example, a potted (i.e., sealed) conduit 110 and into an explosion-proof box 112 where it can connect to a controller 114. The controller 114 can be coupled to incoming power lines 116, 118 that extend into the explosion-proof box 112 from an underground location through, for example, a potted conduit 120.

The system 100 further includes a variable-speed fan 122 located outside the hazardous area 104 and air-coupled to the container 102 via a pipe 124. The fan 122 can be located any distance away from the container 102, but should be positioned as close as possible to the container outside the hazardous area 104. This can minimize the resistance experienced by the fan in forcing air into the container 102. In some embodiments, the position of the fan 122 can be dictated by how far the classified hazardous area 104 extends from the container 102.

The fan 122 can also be coupled to the controller 114 via control lines 126 that extend through a potted conduit 128 between the fan and the controller. The controller 114 can regulate the operating speed of the fan 122 via the control lines 126, as discussed in more detail below. Also disposed adjacent to the fan 122 outside of the hazardous area 104 can be a heating element 130 and a particulate air filter 132. The heating element 130 can be any of a variety of heating elements known in the art, and the controller 114 can manage activation of the heating element using the control lines 126, similar to the regulated operation of the fan 122. The particulate filter 132 can similarly be any of a variety of known air filters, and can be disposed adjacent to an air intake 134 so as to remove dirt and other debris from the air before it is exposed to the heating element 130, fan 122, or electronics 106. In other embodiments, it can be possible to place the filter 132 at a different location because the filter can be a passive (i.e., non-electrical) element that can operate within the hazardous area 104. Accordingly, in certain embodiments, the filter 132 can be positioned within the pipe 124, e.g., at the interface between the pipe and the container 102, etc.

The purge and pressurization system 100 can also include one or more sensors disposed within the container 102 and configured to provide feedback to the controller 114 that can be used to adjust the operating speed of the fan 122. In some embodiments, a pressure sensor 136 can be disposed within the container 102 and coupled to the controller 114. The pressure sensor 136 can detect ambient air pressure within the container and can be used to determine when a set minimum required pressure has been reached within the container 102. The pressure sensor 136 can be any of a variety of pressure sensors known in the art.

In certain embodiments, the container 102 can also include a temperature sensor 138 that is coupled to the controller 114 and configured to detect an ambient temperature within the container 102. Such a sensor can be utilized, for example, to provide feedback to the controller 114 that can be used to selectively activate the heating element 130. The temperature sensor 138 can be any of a variety of temperature sensors known in the art.

As mentioned above, the air purge and pressurization system 100 can be used to create an unclassified environment within the container 102 that allows for operation of electronic components 106 that are insufficiently rated for use in the surrounding hazardous area 104. In general, the pressure sensor 136 can be used to detect when ambient pressure within the container 102 reaches a predetermined minimum level, and to ensure that the pressure does not drop below the minimum required level at any time thereafter. So long as this remains true, power can be selectively applied to the electronics 106. If, however, the detected pressure should ever drop below the minimum required level, the controller 114 can cut power to the electronics 106 to ensure that no explosion occurs. Note that power can be continuously applied to the controller 114 because it is disposed in an explosion-proof box 112. Moreover, while the explosion-proof box 112 and controller 114 are shown outside of the container 102 in FIG. 1, in certain embodiments these components can be disposed elsewhere, such as inside the container 102 or outside of the hazardous area 104 entirely.

Figure 2:
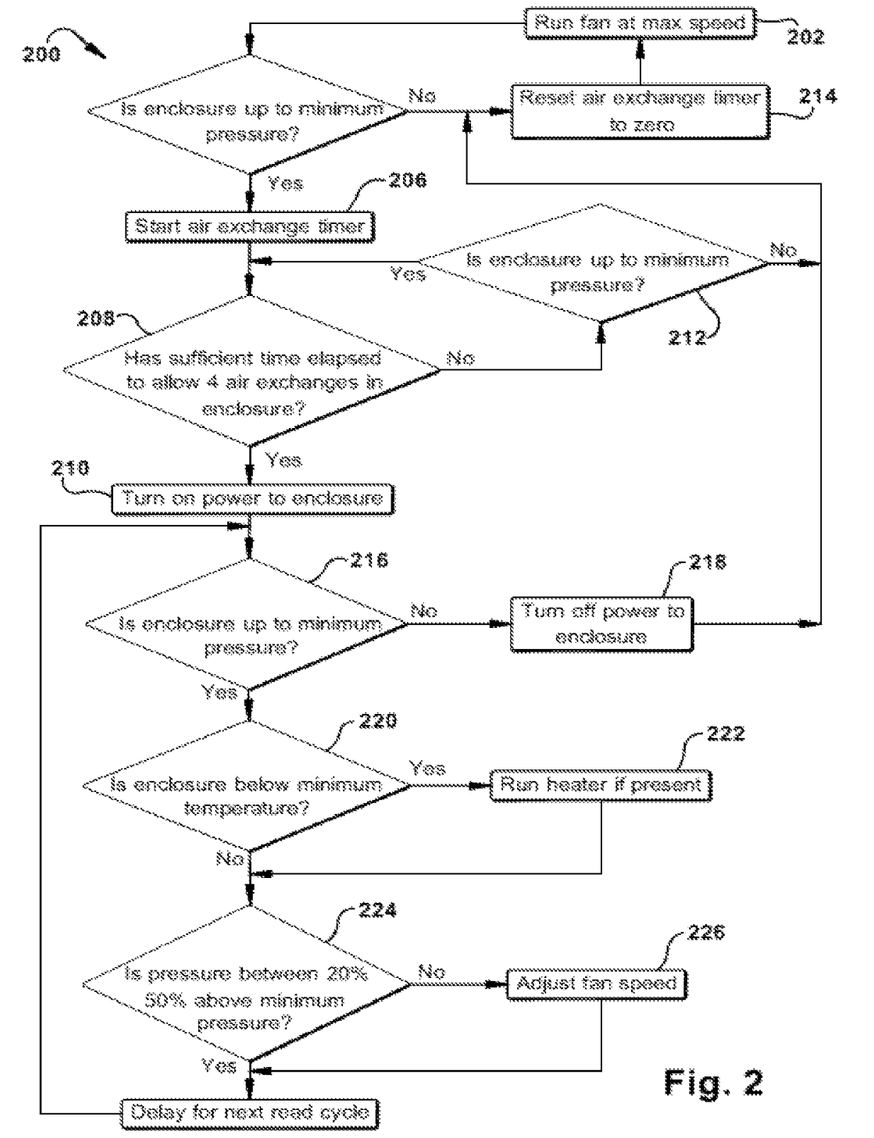
FIG. 2 is a flow chart illustrating one embodiment of a control logic for a purge system.

FIG. 2 illustrates one embodiment of a control logic 200 that can be implemented in software stored on the controller 114 and used to operate the purge and pressurization system 100. When the system 100 is first activated, the variable-speed fan 122 can be run at full speed (see 202) to begin pressurizing the container 102. Ambient pressure within the container 102 can be continuously or periodically detected using the pressure sensor 136 to determine if a minimum required pressure has been reached (see 204).

In certain embodiments, reaching the required minimum pressure within the container 102 does not immediately result in the electronics 106 being powered. Rather, it can be desirable (or even required, depending on applicable regulations) to wait for a predetermined number of air exchanges to have occurred within the container 102 before powering the electronics 106. An air exchange is the process of pumping a volume of air through the container 102 that is equal to the volume of the container itself, such that all of the air within the container is replaced. As mentioned above, the container 102 can include at least one vent 103 that can allow air to escape from the container 102 at a predetermined rate. Accordingly, a simple timer can determine the number of air exchanges that have taken place given the known volume of the container 102 and flow rate of the at least one vent 103.

In some embodiments, then, reaching the minimum required pressure within the container 102 can initiate an air exchange timer (see 206). The timer can be calibrated to allow for any number of predetermined air exchanges before power is selectively applied to the electronics 106 by the controller 114 (see 208, 210). In some embodiments, for example, the timer can be calibrated to allow for four complete air exchanges before power is applied. However, if the detected pressure falls below the minimum required pressure at any time during the air exchanges (see 212), power is not applied to the electronics 106, the air exchange timer is reset (see 214), and the fan 122 is again run at full speed until the minimum pressure is achieved.

On the other hand, if the air exchanges are completed successfully and the minimum pressure is maintained, there can be reasonable certainty that no explosive vapors are present within the container 102 and power can be applied to the electronics 106 (see 210). After this occurs, the pressure can continually or periodically be detected (see 216) using the pressure sensor 136 and, should the detected pressure fall below the minimum required pressure, the controller 114 can disconnect power to the electronics 106 (see 218).

In addition, in embodiments having a temperature sensor 138 and heating element 130, the temperature within the container 102 can be continuously or periodically detected and compared to a predetermined minimum temperature (see 220). The predetermined minimum temperature can be, for example, a minimum operating temperature for the electronics 106. By way of further example, severe cold temperatures can negatively affect the operation of certain components, such as displays and receipt printers, that are commonly used in fuel dispenser payment terminals. As a result, it can be desirable to keep these elements above a certain minimum temperature. In such an embodiment, if the detected temperature is below the predetermined minimum temperature, the heating element 130 can be activated (see 222) to warm the air being introduced into the container 102 by the fan 122.

Still further, once the minimum required pressure has been achieved in the container 102 and the predetermined number of air exchanges have been completed, the speed of the fan 122 can be continuously or periodically adjusted so as to maintain the detected pressure a certain level above the minimum required pressure. For example, in some embodiments the speed of the fan 122 can be adjusted to maintain the detected pressure at a value between about 120% and about 150% of the minimum required pressure (see 224 and 226). Maintaining the pressure at this level can minimize the speed of the fan 122 and the volume of air forced into the container 102 while maintaining safe operation of the system 100.

Minimizing the airflow through the container 102 in this manner can correspondingly minimize any negative side effects of introducing air that is possibly cold, damp, or dirty into the container 102. Moreover, conditioning the air, e.g., by heating it with the heating element 130 or filtering debris using the particulate air filter 132, can further reduce the risk of damaging or detrimentally affecting the operation of electronics 106 within the container 102. All of this can be accomplished while still accounting for changes in pressure outside the container 102 due to temperature, wind speed, etc. In other words, the fan 122 can be operated at an optimum (i.e., minimum) speed necessary to maintain the required minimum pressure within the container 102, regardless of environmental conditions outside the container. Operating the fan 122 in this manner can also save energy and reduce wear and tear on the mechanical components of the system.

Figure 3:
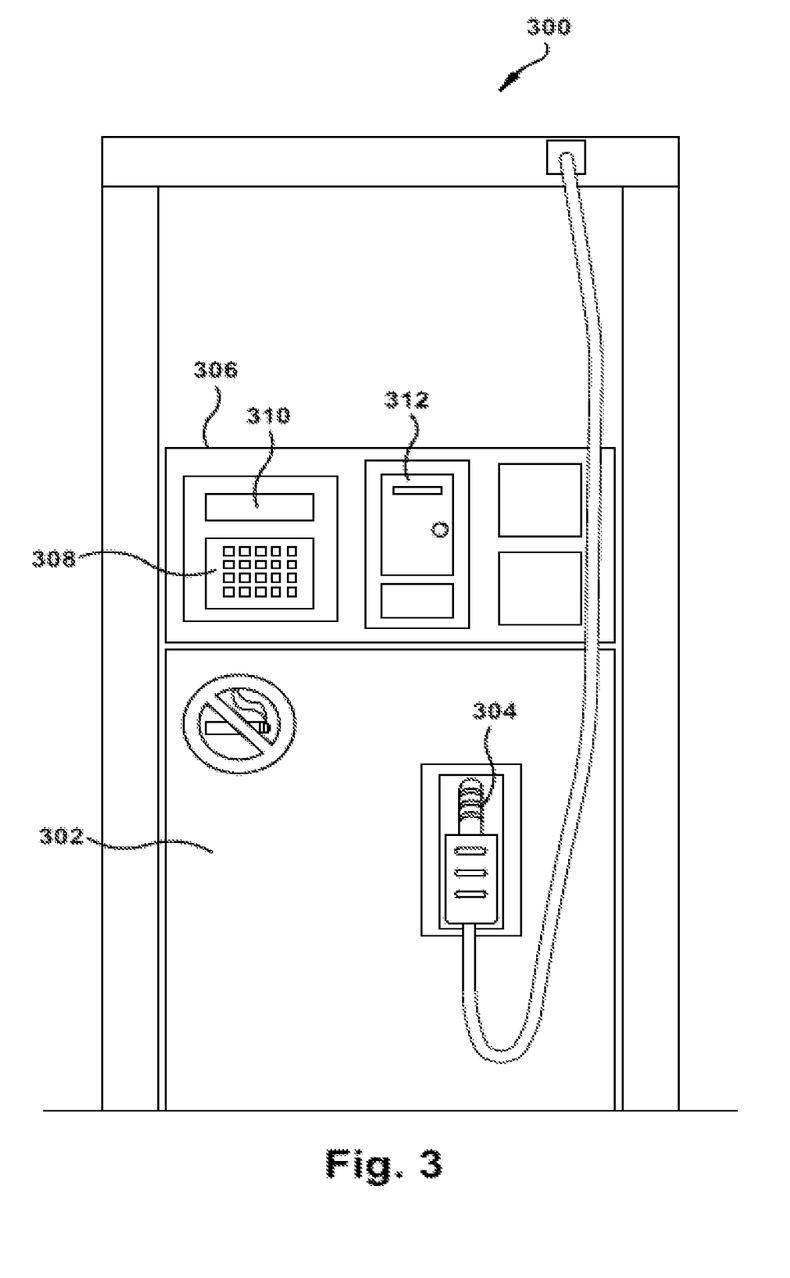
FIG. 3 is a front view illustration of one embodiment of a fuel dispenser.
Figure 4:
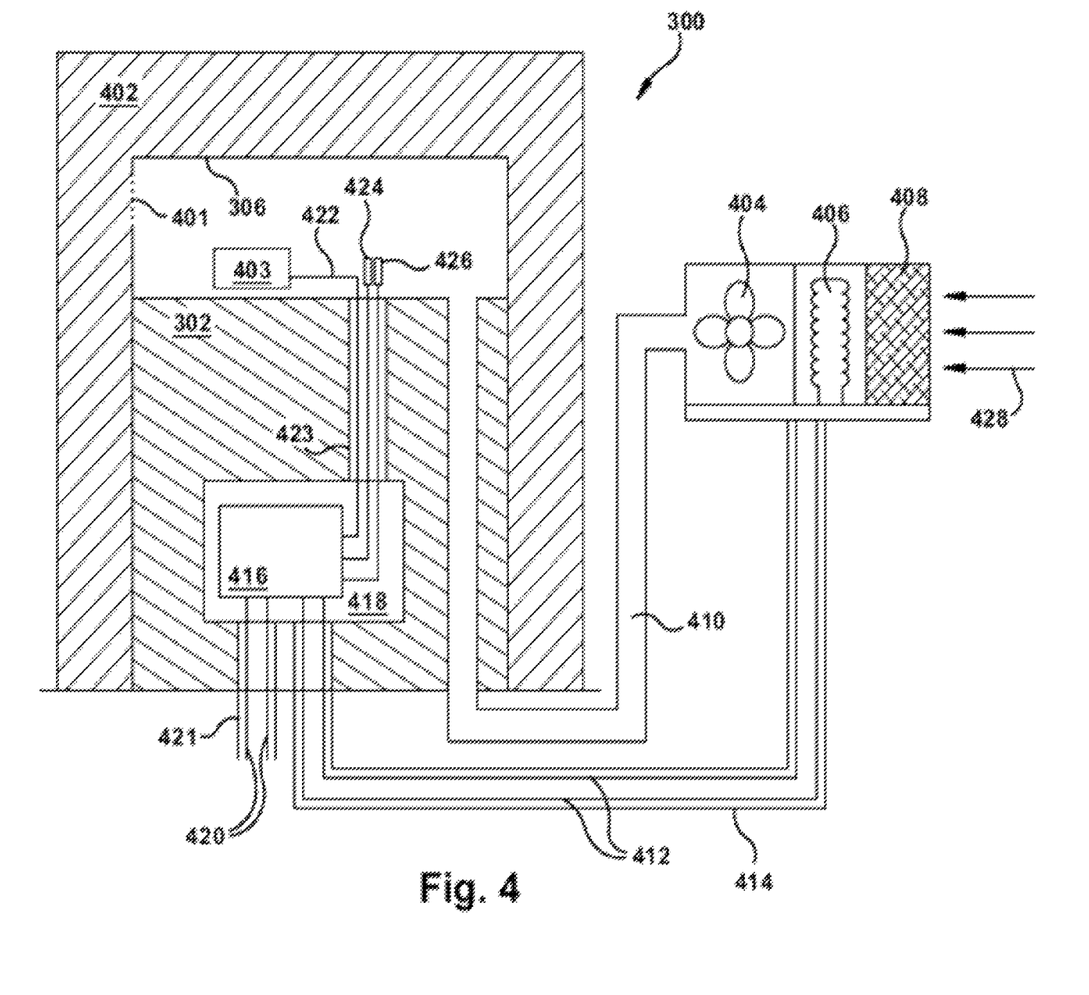
FIG. 4 is a cross-sectional view illustration of the natural gas dispenser of FIG. 3 including a purge system.

As mentioned above, the systems and methods described herein can have particular utility in fuel dispensing applications, though they are in no way limited to use in this field. FIGS. 3-4 illustrate one embodiment of a purge and pressurization system implemented in connection with a fuel dispenser, such as a compressed natural gas (CNG) or liquefied natural gas (LNG) dispenser. In particular, FIG. 3 illustrates a front view of one embodiment of a dispenser 300 that includes a hydraulic chassis 302 containing fuel dispensing equipment to deliver fuel into a portable container (e.g., a vehicle's holding tank) through a nozzle 304. The dispenser 300 also includes an electronic head 306 disposed above the hydraulic chassis 302. The electronic head 306 houses any of a number of electronic components, such as a keypad 308, a display 310, and a receipt printer 312 that make up a payment terminal.

FIG. 4 illustrates the dispenser 300 in cross-section with its hydraulic chassis 302 and electronic head 306 that includes at least one vent 401 (e.g., a dedicated vent or an opening used for another purpose, such as the receipt printer 312), as well as the surrounding classified hazardous area 402. Also shown in FIG. 4 is a variable-speed fan 404, a heating element 406, and a particulate air filter 408 located adjacent to one another outside the hazardous area 402. These components are similar to those described above in connection with FIG. 1. As with the embodiment shown in FIG. 1, the fan 404, heating element 406, and air filter 408 can be air-coupled to the electronic head 306 via a pipe 410, which in the illustrated embodiment extends below ground and through the hydraulic chassis 302 before entering the electronic head 306. Control lines 412 can extend through a potted conduit 414 to connect the fan 404 and the heating element 406 with a controller 416 that is disposed within an explosion-proof box 418 within the hydraulic chassis 302. Similar to the explosion-proof box described above, in certain embodiments the box 418 can be positioned within the electronic head 306, outside the dispenser 300, or even outside the hazardous area 402. Moreover, in some embodiments the controller 416 can itself be an intrinsically safe component, and the explosion-proof box 418 can be omitted.

The controller 416 can be coupled to incoming power lines 420 that extend through a potted conduit 421, and can selectively energize electronic components 403 (e.g., keypad 308, display 310, and receipt printer 312) via a transmission line 422 that extends through a potted conduit 423 from the controller 416 to the electronic head 306. In addition, a pressure sensor 424 and a temperature sensor 426 can be positioned within the electronic head 306 and coupled to the controller 416 to provide feedback input for controlling any of the fan 404 and the heating element 406, as described above.

Similar to the pressure and temperature sensors described in connection with FIG. 1, the pressure sensor 424 and the temperature sensor 426 can be any of a variety of sensors known in the art. In addition, these sensors can be positioned at a variety of locations within the electronic head 306, but should be positioned so as to detect an ambient pressure or temperature within the electronic head 306, not the potted conduit 423. This is because the reduced volume of the conduit 423 can result in a higher pressure and/or temperature being detected than is actually present within the electronic head 306.

Furthermore, the variable speed fan 404, heating element 406, and particulate air filter 408 disposed near air intake 428 can be positioned any distance from the dispenser 300 outside of the hazardous area 402. However, in certain embodiments, it can be advantageous to position these components as close to the dispenser 300 as possible (while remaining outside the hazardous area 402) in order to reduce the resistance experienced by the fan 404 in forcing clean air into the electronic head 306.

All papers and publications cited herein are hereby incorporated by reference in their entirety. One skilled in the art will appreciate further features and advantages of the invention based on the above-described embodiments. Accordingly, the invention is not to be limited by what has been particularly shown and described, except as indicated by the appended claims.

What is claimed is:

1. An air purge and pressurization system, comprising:
an enclosed container located in a hazardous area, the area being hazardous due to presence of an explosive gas external to the container;
a controller configured to operate within the hazardous area and positioned within an explosion-proof box that is located within the enclosed container;
a pressure sensor located within the container and coupled to the controller; and
a variable-speed fan located outside the hazardous area and coupled to the controller, the fan being configured to force air from outside the hazardous area into the container;
wherein the controller is configured to adjust a speed of the fan between different non-zero speeds, based upon an air pressure detected by the pressure sensor, to maintain the detected pressure above a minimum pressure.

2. The system of claim 1, further comprising at least one electrically powered component disposed within the container, wherein the controller is further configured to selectively power the at least one electrically powered component if the detected pressure is above the minimum pressure.

3. The system of claim 1, wherein the container includes at least one vent to allow air within the container to escape.

4. The system of claim 1, further comprising a temperature sensor located within the container and coupled to the controller, wherein the controller is further configured to vary the speed of the fan based on both the detected air pressure and a temperature detected by the temperature sensor.

5. The system of claim 4, further comprising a heating element located outside the hazardous area adjacent to the fan, wherein the controller is further configured to selectively activate the heating element to maintain the detected temperature above a minimum temperature.

6. The system of claim 1, further comprising a particulate filter air-coupled to the container such that air forced into the container is first passed through the particulate filter.

7. The system of claim 1, wherein the minimum pressure is above a minimum positive pressure within the container.

8. The system of claim 1, wherein the controller is configured to operate within the hazardous area without producing a spark capable of ignition.

9. The system of claim 1, wherein the explosive gas is present in the hazardous area in a concentration sufficient to ignite.

\* \* \* \* \*